Jan. 9, 1945.  C. N. BENSON  2,367,088
TOP ROLL ASSEMBLY
Filed March 21, 1942
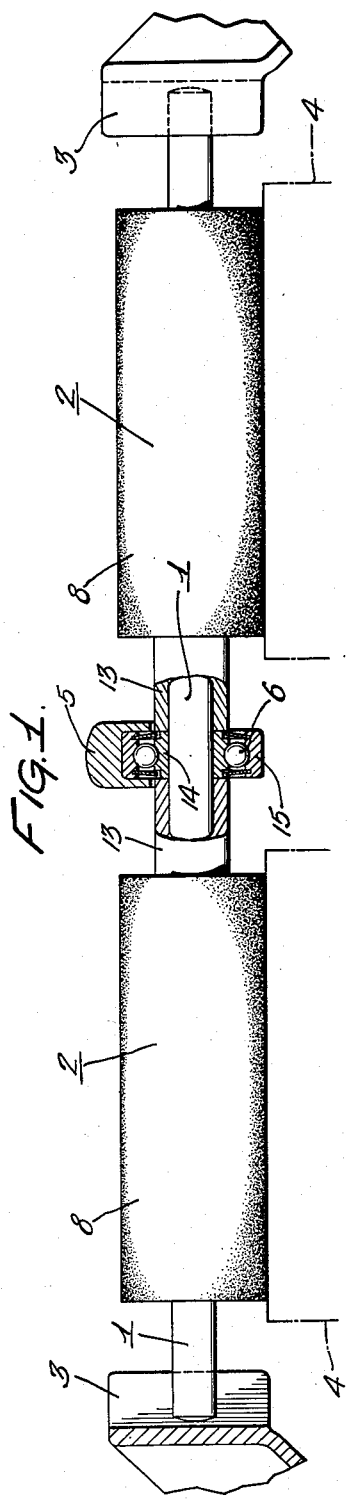
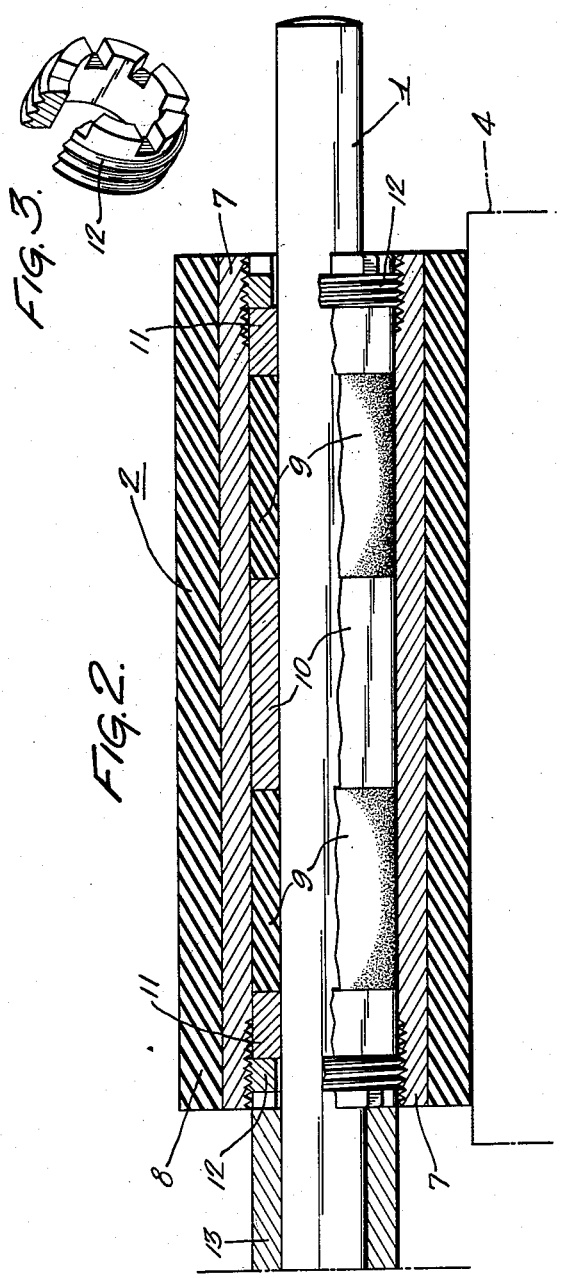
Inventor:
Carl N. Benson
by his Attorneys
Howson & Howson Patented Jan. 9, 1945

2,367,088

UNITED STATES PATENT OFFICE 2,367,088

TOP ROLL ASSEMBLY

Carl N. Benson, Jenkintown, Pa., assignor to S K F Industries, Inc., Philadelphia, Pa., a corporation of Delaware Application March 21, 1942, Serial No. 435,677

5 Claims. (Cl. 19—142)

A principal object of this invention is to provide an improved top roll assembly for textile machinery.

More specifically, an object of the invention is to provide improved means for attaching the top roll platens to their shaft or arbor, said attaching means being of a character to afford easy and rapid disassembly for replacement, when necessary, of bearings, platen surfaces, or other parts of the assembly.

The invention further contemplates an improved bearing arrangement, as hereinafter described.

In the attached drawing:

Figure 1 is a front elevational view, partly in section, of a top roll assembly made in accordance with the invention;

Fig. 2 is an enlarged longitudinal sectional view of one end of the assembly, and Fig. 3 is a view in perspective of one of the elements of the assembly.

The assembly illustrated in the drawing consists essentially of a shaft or arbor 1 and rolls 2, 2, said rolls in accordance with the present invention being attached to the shaft for rotation with the latter. In the machine of which the said assembly forms a part, the ends of the shaft 1 are engaged in guides 3, 3 which maintain the assembly and, specifically, the rolls 2 in operative engagement with the underlying steel rolls 4, 4. To afford the required pressure between the rolls, the top roll assembly is weighted by way of a saddle 5 which seats upon an anti-friction bearing 6 upon the shaft 1 between the rolls 2.

The rolls 2, see Fig. 2, consist individually of a cylindrical shell 7 which may suitably be made of metal and which has an inside diameter greater than the diameter of the shaft. This shell has a cover 8, of rubber or other suitable material, and with this cover constitutes the roll platen. Between the shell 7 and the shaft are two sleeves 9 of resilient rubber, the inner ends of the sleeves being spaced apart by an intervening sleeve 10 of metal or other suitable material. The sleeve 10 also functions to center the roll 2 on the shaft and is made to fit closely within the sleeve 7 and with a close sliding fit on the shaft 1. Sleeves 11, 11, which may also function after the manner of sleeve 10 as a centering means for the roll 2, lie outwardly of the resilient sleeves 9, and the entire system of sleeves is held in position in the shell 7 by units 12, 12, see Fig. 3, which are threaded into the ends of the shell, as shown.

Normally, the resilient sleeves 9 are sufficiently loose on the shaft 1 to permit the rolls to slide readily on the ends of the shaft 1, but by turning one or both of the nuts 12 inwardly, the said sleeves may be compressed axially with resulting radial expansion of the wall of the sleeve to an extent causing the latter to bind tightly against both the shaft and the inner surface of the shell 7 so that the roll is firmly attached to the shaft. The roll may as readily be released from the shaft, by simply backing off the nut or nuts, for removal of the roll or the platen or any other of the separable parts of the roll or assembly that may require replacement. It will be noted that when the nuts are inserted in the opposite ends of the platen as above described, the nut 12 at one end of the platen acts as an abutment within the platen toward which the sleeves 9, 10 and 11 are forced when the nut 12, at the opposite end of the platen, is tightened to expand the resilient sleeves 9. The nuts 12 also function to retain the sleeves 9, 10 and 11 in assembled relation within the platen and prevent substantial relative axial movement between the sleeves 9, 10 and 11 and the platen. Thus the platen and sleeves may be moved as a unit axially of the shaft 1 without disturbing the assembled relation of the platen and sleeves or effecting the functional relation existing between the platen and the resilient sleeves 9.

In the present instance the positions of the rolls 2 at opposite sides of the bearing 6 is determined by spacing sleeves 13, 13, which lie one at each side of and in contact with the inner race 14 of the bearing, and which function as positioning stops for the rolls. The inner race rotates with the shaft, while the outer race 15 is fixed in the saddle 5 and remains stationary. This condition is most favorable to long bearing life. Preferably the bearing is of a sealed type, such, for example, as disclosed in U. S. Patent No. 2,031,571.

I claim:

1. In a top roll assembly, a shaft, a roll platen on the shaft, a resilient sleeve interposed between the platen and the shaft and normally loose on the latter, means at one end of and within the platen constituting an abutment, and means including a nut element threaded into the end of the platen opposite said abutment for forcing the resilient sleeve toward said abutment and expanding said sleeve radially into binding engagement both with the platen and the shaft said abutment and nut element retaining said sleeve in assembled relation within the platen and preventing substantial relative axial movement between said sleeve and platen when the said nut element is loosened and said platen and sleeve are moved axially on said shaft.

2. In a top roll assembly, a shaft, a roll platen on the shaft, a plurality of resilient sleeves interposed between the shaft and the platen, rigid spacing means for said sleeves, said sleeves and spacing means being movable axially on said shaft, and means including separate nut elements threaded into opposite ends of said platen and movable toward each other for applying an axial thrust on the ends of said sleeves and spacing means so as to expand said sleeves radially into binding engagement both with the platen and the shaft said nut elements retaining said sleeves and spacing means in assembled relation within the platen and preventing substantial relative axial movement between said sleeves, spacing means and platen when said nuts are loosened and said platen, sleeves and spacing means are moved axially on said shaft.

3. In a top roll assembly, a shaft, a roll platen embracing the shaft, rigid means in the interior of the platen having a close sliding fit on the shaft for positively centering the platen on the shaft, resilient means confined between and frictionally binding the platen and shaft together, and means operatively associated with the resilient means for effecting release of the said frictional binding action.

4. In a top roll assembly, a shaft, a roll platen embracing the shaft, rigid means interposed between and having a close sliding fit both on the shaft and in the platen for positively centering the platen on the shaft, resilient means confined between and frictionally binding the platen and shaft together, and means operatively associated with the resilient means for effecting release of the said frictional binding action.

5. In a top roll assembly, a shaft, a roll platen embracing the shaft, resilient means confined between and frictionally binding the platen and shaft together, means operatively associated with the resilient means for effecting release of the said frictional binding action, and means on the shaft independent of said resilient means and having a close sliding fit with the interior of said platen for positively and accurately centering the platen on the shaft.

CARL N. BENSON.